(12) United States Patent
Pearson et al.

(10) Patent No.: US 10,577,949 B2
(45) Date of Patent: Mar. 3, 2020

(54) COMPONENT FOR A GAS TURBINE ENGINE

(71) Applicant: General Electric Company, Schenectady, NY (US)

(72) Inventors: Shawn Michael Pearson, Niskayuna, NY (US); Kirk Douglas Gallier, Liberty Township, OH (US); Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 15/182,651

(22) Filed: Jun. 15, 2016

(65) Prior Publication Data
US 2017/0362943 A1    Dec. 21, 2017

(51) Int. Cl.
*F01D 5/28*    (2006.01)

(52) U.S. Cl.
CPC ........ *F01D 5/282* (2013.01); *F05D 2260/941* (2013.01); *F05D 2300/5024* (2013.01); *F05D 2300/522* (2013.01); *F05D 2300/6033* (2013.01)

(58) Field of Classification Search
CPC ...... F01D 5/282; F01D 5/18; F05D 2260/941; F05D 2230/50; F05D 2260/20; F05D 2220/323; F05D 2240/30; F05D 2300/522; F05D 2300/5024; F05D 2300/6033
See application file for complete search history.

(56) References Cited

U.S. PATENT DOCUMENTS

| | | | |
|---|---|---|---|
| 6,280,550 B1 | 8/2001 | Steibel et al. | |
| 7,153,464 B2 | 12/2006 | Millard et al. | |
| 7,229,254 B2 | 6/2007 | Bast et al. | |
| 7,282,274 B2 | 10/2007 | Millard et al. | |
| 7,641,440 B2 | 1/2010 | Morrison et al. | |
| 8,202,588 B2* | 6/2012 | Keller | B32B 18/00 138/111 |
| 8,257,809 B2* | 9/2012 | Morrison | B32B 18/00 428/161 |
| 8,528,339 B2* | 9/2013 | Morrison | F01D 5/147 415/173.1 |
| 2012/0266603 A1 | 10/2012 | Uskert et al. | |
| 2016/0177743 A1* | 6/2016 | Thomas | F01D 5/284 416/230 |
| 2016/0252250 A1* | 9/2016 | Bunker | F23R 3/007 60/753 |
| 2016/0281205 A1* | 9/2016 | Strock | C23C 4/11 |

* cited by examiner

*Primary Examiner* — Justin D Seabe
*Assistant Examiner* — Adam W Brown
(74) *Attorney, Agent, or Firm* — Dority & Manning, P.A.

(57) ABSTRACT

A component for a gas turbine engine includes a first region formed substantially of a first CMC material, wherein first region defines a first thermal conductivity. The component further includes a second region formed substantially of a second CMC material, wherein the second region defines a second thermal conductivity. Further, the component defines a thickness and the first region is positioned adjacent to the second region along the thickness, wherein the first thermal conductivity is different than the second thermal conductivity to alert a thermal profile of the component.

22 Claims, 12 Drawing Sheets

COMPONENT FOR A GAS TURBINE ENGINE

FIELD OF THE INFORMATION

The present subject matter relates generally to gas turbine engines and, more particularly, to a component for a gas turbine engine formed substantially of a ceramic matrix composite (CMC) material.

BACKGROUND OF THE INVENTION

A gas turbine engine generally includes, in serial flow, a compressor section, a combustion section, a turbine section and an exhaust section. In operation, air enters an inlet of the compressor section where one or more compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

It is generally desirable to increase temperatures in the combustion section and turbine section to provide for a higher efficiency operation of the gas turbine engine. However, it may be difficult for certain components within, e.g., the combustion section and the turbine section, to withstand such elevated temperatures. Accordingly, ceramic matrix composite ("CMC") materials are of particular interest for use in gas turbine engines, as such components are generally better able to withstand the higher operating temperature sought after. CMC materials typically include a ceramic fiber reinforcement material embedded in a ceramic matrix material.

However, it may still be beneficial to ensure the CMC materials remain below a temperature threshold for useful life and function. Thus, a component formed substantially of a CMC material capable of better managing the thermal properties of such component would be useful. More specifically, a component formed of a CMC material having one or more attributes in the component that allow for management of the local thermal gradients would be particularly useful.

BRIEF DESCRIPTION OF THE INVENTION

Aspects and advantages of the invention will be set forth in part in the following description, or may be obvious from the description, or may be learned through practice of the invention.

In a first exemplary embodiment, a component for a gas turbine engine is provided. The component includes a first region formed substantially of a first CMC material, wherein first region defines a first thermal conductivity. The component further includes a second region formed substantially of a second CMC material, wherein the second region defines a second thermal conductivity. Further, the component defines a thickness and the first region is positioned adjacent to the second region along the thickness, wherein the first thermal conductivity is different than the second thermal conductivity to alter a thermal profile of the component.

In a second exemplary embodiment, a method for manufacturing a component of a gas turbine engine is provided. The method includes providing a first plurality of CMC plies to form a first region of the component, wherein the first region defines a first thermal conductivity. The method further includes providing a second plurality of CMC plies to form a second region, wherein the second plurality of CMC plies are provided to a location adjacent to the first plurality of CMC plies such that the second region is positioned adjacent to the first region. In addition, the second region defines a second thermal conductivity that is different than the first thermal conductivity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
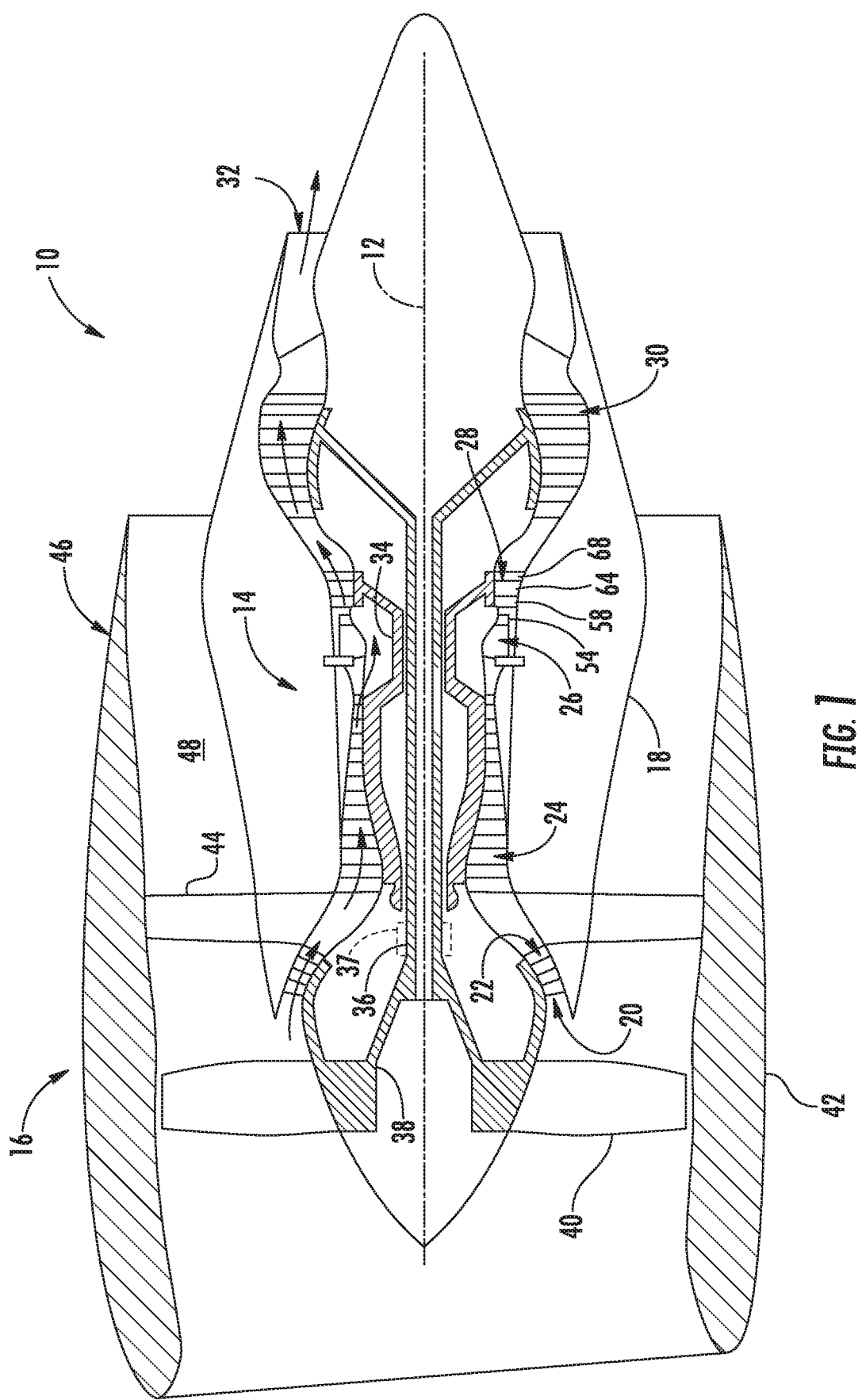
FIG. 1 is a schematic cross-sectional view of a gas turbine engine in accordance with one embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

In general, the present subject matter is directed to a component of a gas turbine engine and a method of manufacturing the component. More specifically, in several embodiments, the component includes a first region formed of a first CMC material and a second region formed of a second CMC material such that the first region defines a first thermal conductivity that is different from a second thermal conductivity defined by the second region. In particular, the first thermal conductivity may be distinguished from the second thermal conductivity by varying the first CMC material from the second CMC material. As an example, the second CMC material may be formed of a plurality of plies having a greater density than a plurality of plies forming the first CMC material such that the second thermal conductivity is greater than the first thermal conductivity. As another example, thermal voids may be formed in the first region such that the first thermal conductivity is less than the second thermal conductivity.

It should be appreciated that the component and method for manufacturing the component may be used on any suitable gas turbine engine, including aircraft-based turbine engines and land-based turbine engines, regardless of the engine's current assembly state (e.g., fully or partially assembled).

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also be connected to a fan spool or shaft 38 of the fan section 16. In alternative configurations, the LP spool 36 may be connected to the fan spool 38 via a speed reduction device 37 such as a reduction gear gearbox in an indirect-drive or geared-drive configuration. Such speed reduction devices may be included between any suitable shafts/spools within turbofan 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
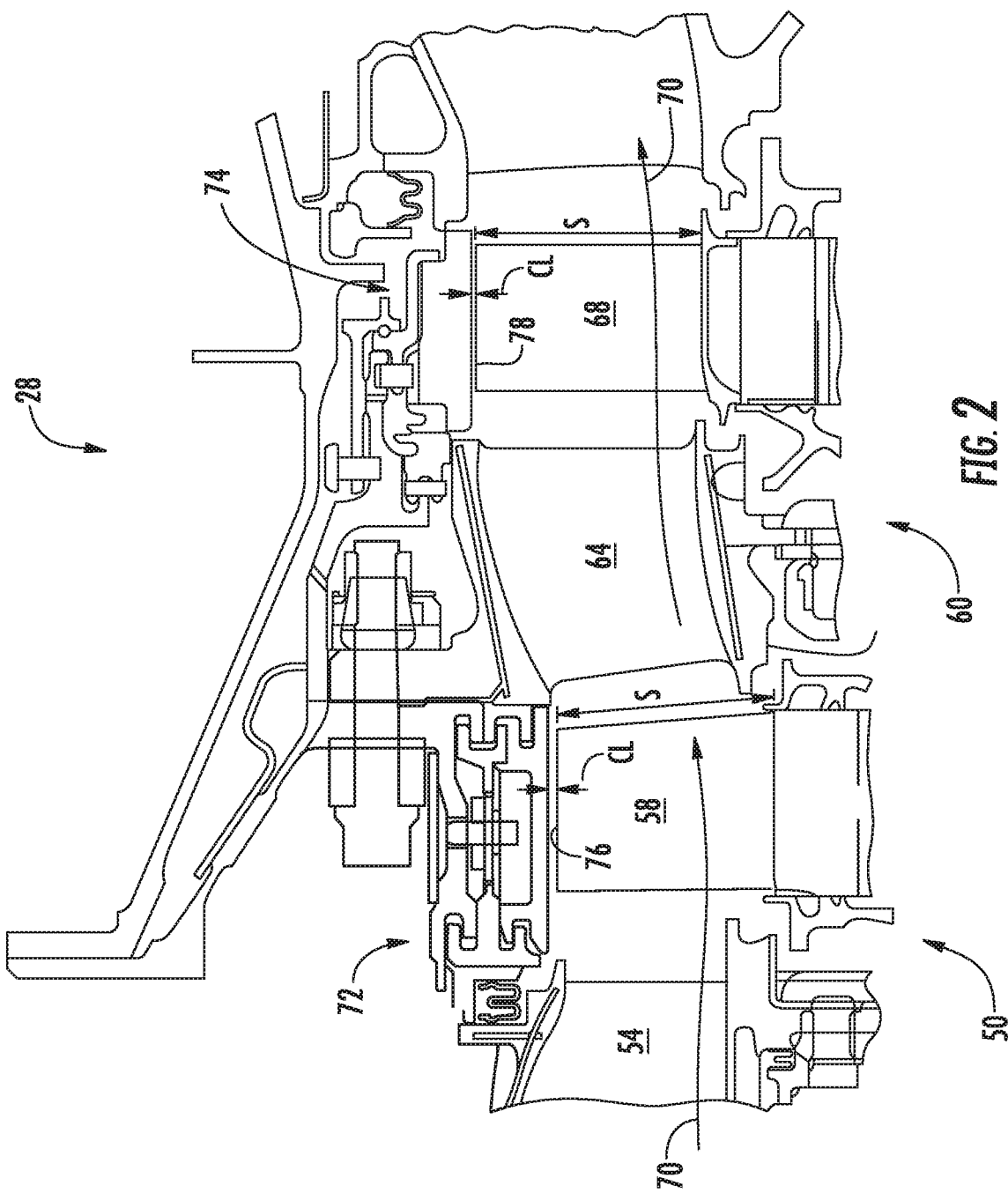
FIG. 2 is an enlarged cross-sectional side view of a high pressure turbine portion of a gas turbine engine in accordance with one embodiment of the present disclosure.

FIG. 2 provides an enlarged cross-sectional view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 each define a span S along the radial direction R and at least partially define a hot gas path 70 for routing combustion gases from the combustion section 26 (FIG. 1) through the HP turbine 28.

As further shown in FIG. 2, the HP turbine 28 may include one or more shroud assemblies, each of which forms an annular ring about an annular array of rotor blades. For example, a shroud assembly 72 forms an annular ring around the annular array 56 of rotor blades 58 of the first stage 50, and a shroud assembly 74 forms an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage within the hot gas path 70.

It should be noted that shrouds and shroud assemblies may additionally be utilized in a similar manner in the low pressure compressor 22, high pressure compressor 24, and/or low pressure turbine 30. Accordingly, shrouds and shroud assemblies as disclosed herein are not limited to use in HP turbines, and rather may be utilized in any suitable section of a gas turbine engine 14.

Figure 3:
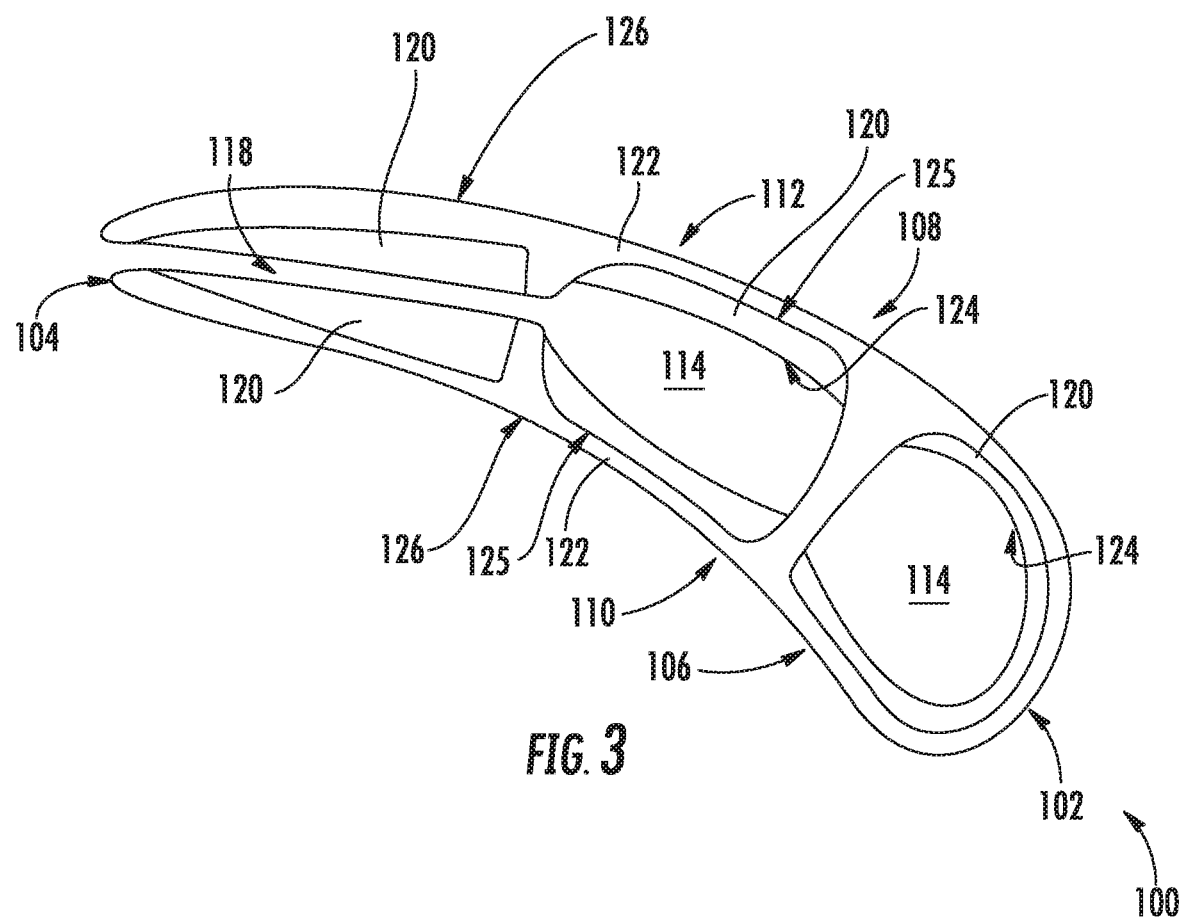
FIG. 3 illustrates a cross-sectional view of an exemplary turbine rotor blade that may be used with the gas turbine engine shown in FIG. 1.

FIG. 3 provides a cross-sectional view of a turbine rotor blade 100 along its span S in accordance with an exemplary embodiment of the present disclosure. The turbine rotor blade may be configured as one or more of the turbine rotor blades 58, 68 described above and shown in FIG. 2. For example, the turbine rotor blade 100 may be positioned in the exemplary hot gas path 70 of the gas turbine engine 14 described above. The turbine rotor blade 100 defines a leading edge 102 and a trailing edge 104, along with a pressure side 106 and a suction side 108. The exemplary turbine rotor blade 100 generally includes a pressure side wall 110 and a suction side wall 112 that, for the embodiment depicted, are integrally formed at the leading edge 102 and trailing edge 104. As shown, the turbine rotor blade 100 defines a cooling passage 114 that extends along the span S of the turbine rotor blade 100. Additionally, proximate to the trailing edge 104, the turbine rotor blade 100 include a trailing edge section 118 defining a plurality of trailing edge cooling holes extending from the cooling passage 114 to the trailing edge 104.

Referring still to FIG. 3, the turbine rotor blade 100 includes a first region 120 and a second region 122 which, for the embodiment depicted, collectively form the pressure side wall 110 and the suction side wall 112. The first region 120 of the turbine rotor blade 100 includes a first surface 124 that defines a portion of the cooling passage 114. The second region 122 is positioned adjacent to the first region 120. More specifically, the second region 122 contacts the first region 120 at a junction 125 positioned therebetween, and the second region 122 extends between the junction 125 and a second surface 126. For the embodiment depicted, the second surface 126 is in direct thermal communication with the hot gas path 70 and, more particularly, is exposed to the hot gas path 70 of the gas turbine engine 14. Although not depicted, in certain embodiments, a thermal coating may overlay the second surface 126 to reduce thermal stress experienced by the turbine rotor blade 100 during operation of the gas turbine engine 14.

Figure 4:
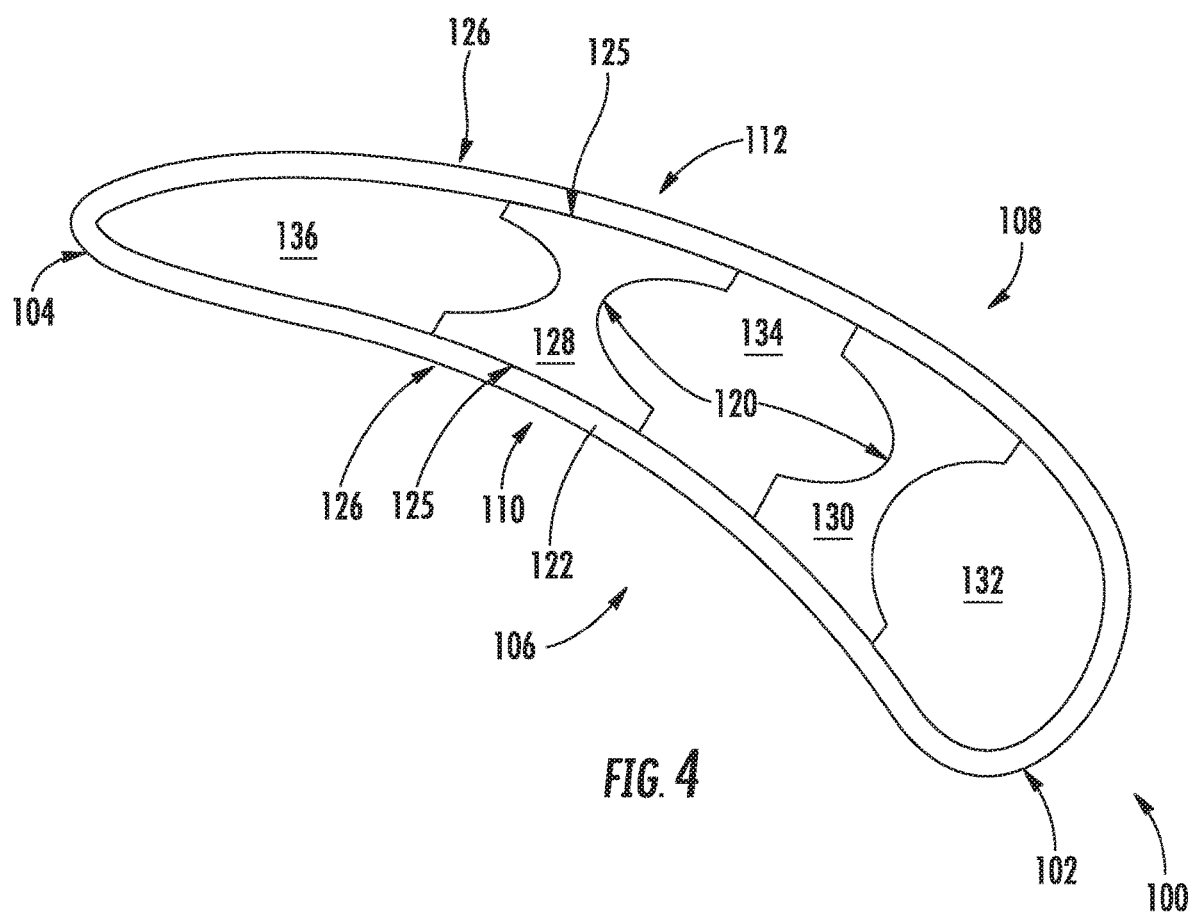
FIG. 4 illustrates a cross-sectional view of another exemplary turbine rotor blade that may be used with the gas turbine engine shown in FIG. 1.

Referring now briefly to FIG. 4, a cross-sectional view of a turbine rotor blade 100 in accordance with another exemplary embodiment of the present disclosure is depicted. The exemplary turbine rotor blade 100 depicted in FIG. 4 may be configured in substantially the same manner as exemplary turbine rotor blade 100 depicted in FIG. 3, and accordingly, the same or similar numbers may refer to the same or similar parts. For example, the turbine rotor blade 100 defines a leading edge 102 and a trailing edge 104, and includes a pressure side wall 110 and a suction side wall 112.

However, for the embodiment of FIG. 4, the first region 120 forms a first rib 128 and a second rib 130 of the turbine rotor blade 100. More specifically, the first and second ribs 128, 130 of the first region 120 divide the cooling passage 114 into a first cavity 132, a second cavity 134, and a third cavity 136.

Figure 5:
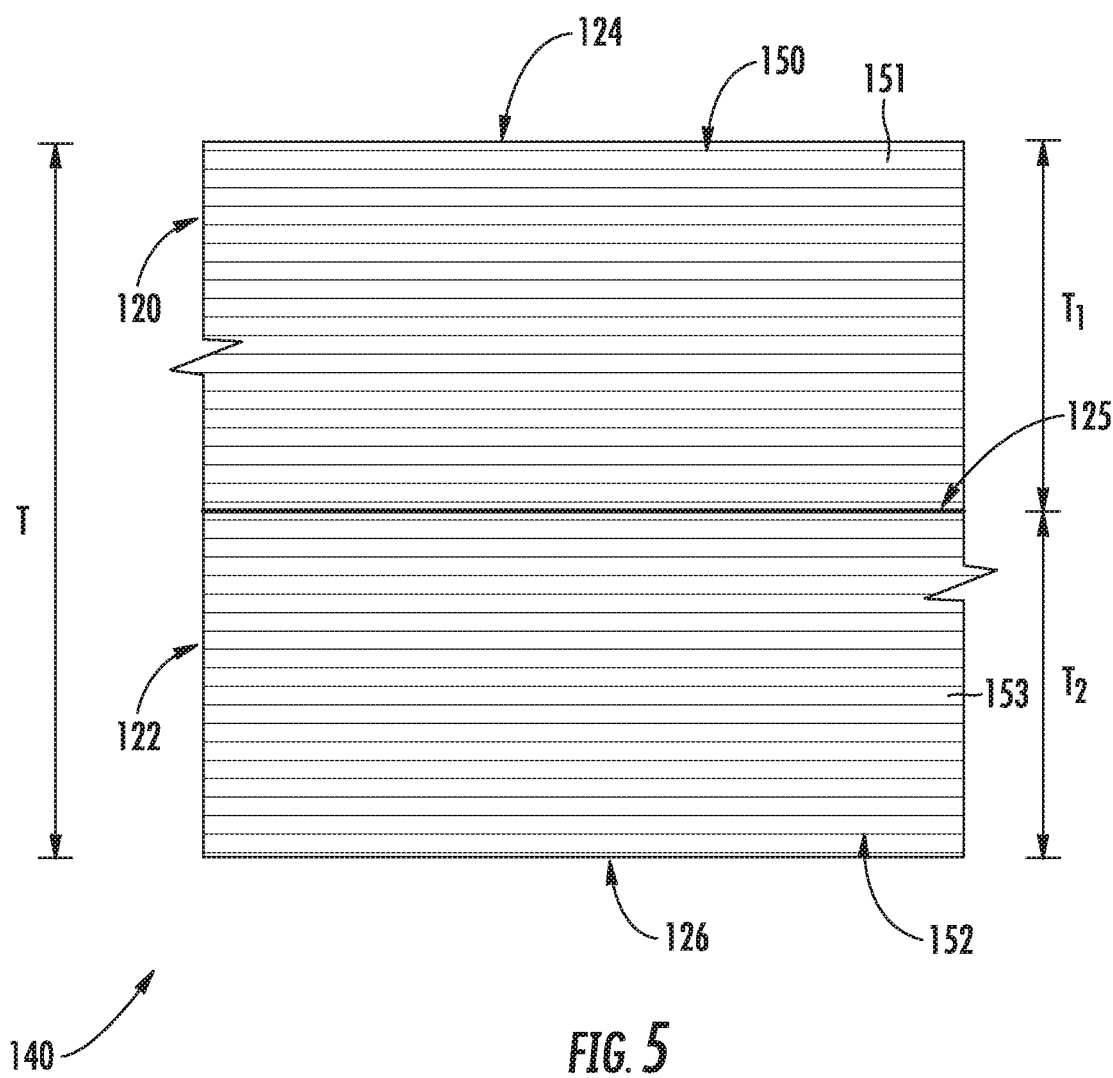
FIG. 5 illustrates a close-up view of a wall of a turbine rotor blade in accordance with an embodiment of the present disclosure.

FIG. 5 depicts a close-up view of a first and second region 120, 122 of a wall 140 of a turbine rotor blade 100 in accordance with an exemplary aspect of the present disclosure. The first and second region 120 and 122 of FIG. 5 may be configured as the first and second region 120 and 122 of the turbine rotor blade 100 of FIG. 3, or of FIG. 4, or of any other suitable turbine rotor blade 100. Alternatively, still, in other exemplary embodiments, the first and second region 120, 122 of FIG. 5 may for a wall 140 of any other suitable component, such as a liner or shroud or nozzle.

As shown in FIG. 5, the second region 122 is positioned adjacent to the first region 120 such that the second region 122 is contiguous with the first region 120. Further, the first region 120 defines a thickness $T_1$, and the second region 122 defines a thickness $T_2$. Collectively, the thickness $T_1$ of the first region 120 and the thickness $T_2$ of the second region 122 define a thickness T of the wall 140 of the turbine rotor blade 100. It should be appreciated that, in some embodiments, the thickness $T_1$ of the first region 120 may be greater than the thickness $T_2$ of the second region 122. Alternatively, in other embodiments, the thickness $T_1$ of the first region 120 may be less than the thickness $T_2$ of the second region 122. Still further, in some embodiments, the thickness $T_1$ of the first region 120 may be equal to the thickness $T_2$ of the second region 122.

Additionally, it should be appreciated that, in some embodiments, the first and second regions 120 and 122 may define any suitable cross-sectional shape. For example, the first or second region 120, 122 may be tapered such that a thickness of the first or second region 120, 122 varies along a length of the wall 140. Further, in other embodiments, the first and/or second regions 120 and 122 may define an arcuate or wavy cross-sectional shape.

As shown in FIG. 5, the first region 120 is formed substantially of a first ceramic matrix composite (CMC) material 150, and the second region 122 is formed substantially of a second CMC material 152. As used herein, "formed substantially of" refers to the region being formed of at least about 85 percent CMC by volume in a final form. In another embodiment, "formed substantially of" refers to the region being formed of at least 95 percent CMC by volume in a final form. Exemplary CMC materials utilized may include silicon carbide, silicon, silica, carbon, or alumina matrix materials or combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

In one embodiment, the first CMC material 150 includes one or more plies 151 of CMC material laid up to form the first region 120 of the turbine rotor blade 100, and the second CMC material 152 includes one or more plies 153 of CMC material similarly laid-up to form the second region 122 of the turbine rotor blade 100. The first region 120 defines a first thermal conductivity, $k_1$, and the second region 122 defines a second thermal conductivity, $k_2$. The second thermal conductivity, $k_2$, is different than the first thermal conductivity, $k_1$, to alter a thermal profile of the turbine rotor blade 100.

The second thermal conductivity $k_2$ may, in one embodiment, be greater than the first thermal conductivity $k_1$. As an example, the second thermal conductivity $k_2$ may be between approximately 10% and approximately 50% greater than the first thermal conductivity $k_1$. In another embodiment, the second thermal conductivity $k_2$ may be between approximately 10% and approximately 25% greater than the first thermal conductivity $k_1$. Still further, in yet another embodiment, the second thermal conductivity $k_2$ may be approximately 20% greater than the first thermal conductivity $k_1$.

In yet another embodiment, the first thermal conductivity $k_1$ may be greater than the second thermal conductivity $k_2$. As an example, the first thermal conductivity $k_1$ may be between approximately 10% and approximately 50% greater than the second thermal conductivity $k_2$. In another embodiment, the first thermal conductivity $k_1$ may be between approximately 10% and approximately 25% greater than the second thermal conductivity $k_2$. Still further, in yet another embodiment, the first thermal conductivity $k_1$ may be approximately 20% greater than the second thermal conductivity $k_2$.

Figure 6A:
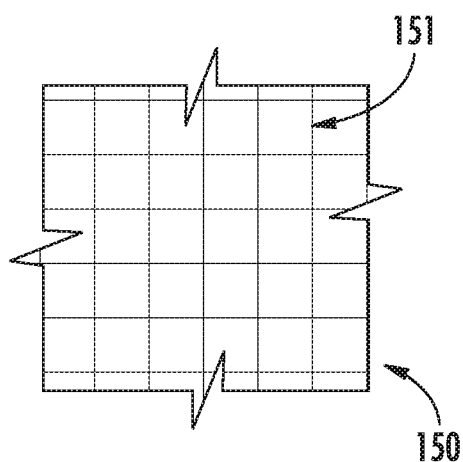
FIG. 6A illustrates a close-up view of a first region of the wall shown in FIG. 5.
Figure 6B:
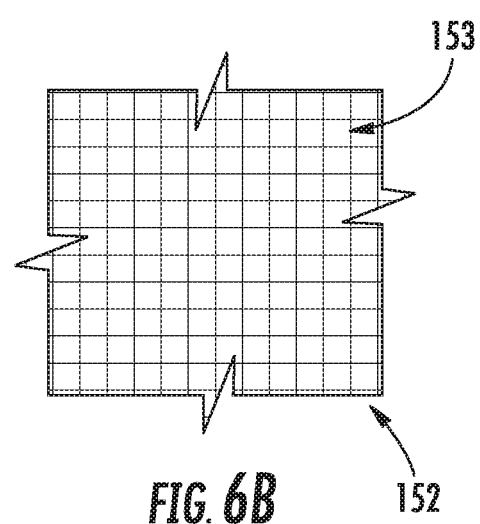
FIG. 6B illustrates a close-up view of a second region of the wall shown in FIG. 5.

In certain embodiments, the first thermal conductivity $k_1$ of the first region 120 may be distinguished from the second thermal conductivity $k_2$ of the second region 122 by varying the first CMC material 150 forming the first region 120 from the second CMC material 152 forming the second region 122. More specifically, referring now to FIGS. 6A and 6B, close-up, schematic views are provided of a ply 151 of CMC material forming the first CMC material 150, and a ply 153 of CMC material forming the second CMC material 152. As is depicted schematically, the second CMC material 152 is formed of a plurality of plies 153 (FIG. 6B) having a greater density than the plurality of plies 151 (FIG. 6A) forming the first CMC material 150. Such may result, e.g., from varying a spacing of the fibers within the plurality of plies 151, 153, or from varying a size of the fibers within the plurality of plies 151, 153. Alternatively, a density of the first and second CMC material 150, 152 may be varied by adding spacers or fillers within the plies 151, 153.

Further, as will be appreciated, varying a density of the first CMC material 150 forming the first region 120 as compared to the second CMC material 152 forming the second region 122 allows for the varying of the overall thermal conductivities of such regions. For example, providing less dense CMC material as the first CMC material 150 (forming the first region) and a more dense CMC material as the second CMC material 152 (forming the second region) allows for the first thermal conductivity $k_1$ to be less than the second thermal conductivity $k_2$. Of course, in other exemplary embodiments, the densities of the CMC material forming the first and second regions 120 and 122 may be reversed such that the first thermal conductivity $k_1$ is greater than the second thermal conductivity $k_2$.

Figure 7:
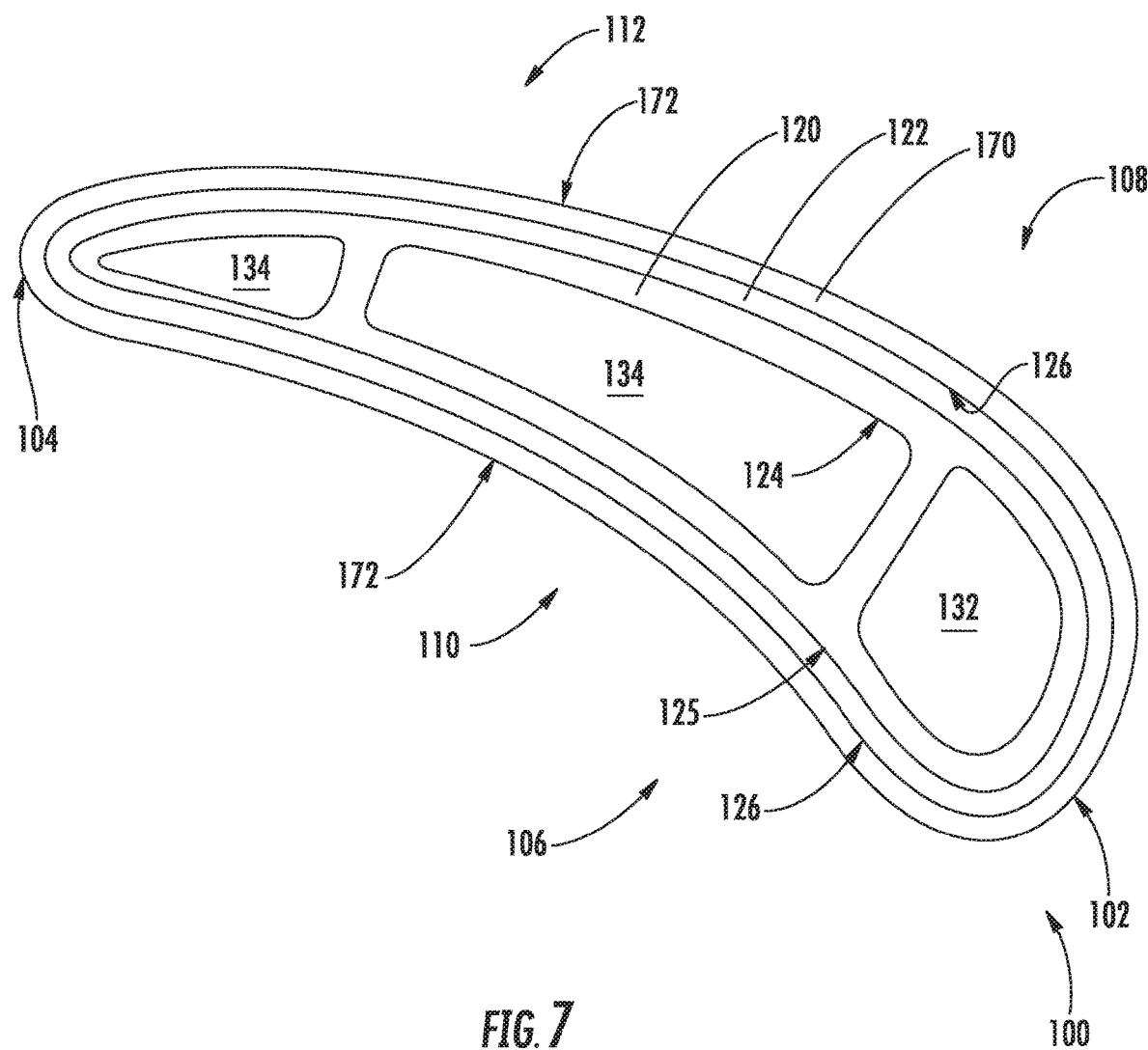
FIG. 7 illustrates a cross-sectional view of yet another exemplary turbine rotor blade that may be used with the gas turbine engine shown in FIG. 1.

Referring now briefly to FIG. 7, a cross-sectional view of a turbine rotor blade 100 in accordance with another exemplary embodiment of the present disclosure is depicted. The exemplary turbine rotor blade 100 depicted in FIG. 7 may be configured in substantially the same manner as exemplary turbine rotor blades 100 depicted in FIGS. 3 and 4, and accordingly, the same or similar numbers may refer to the same or similar parts. For example, the turbine rotor blade 100 defines a leading edge 102 and a trailing edge 104, and includes a pressure side wall 110 and a suction side wall 112. Moreover, the turbine rotor blade 100 includes a first region 120 and a second region 122.

However, for the embodiment of FIG. 7, the turbine rotor blade 100 additionally includes a third region 170 positioned adjacent to the second region 122. More specifically, the third region 170 extends between the second surface 126 of the second region 122 and a third surface 172 of the third region 170. The first region 120, second region 122, and third region 170 collectively form the pressure and suction sidewalls 110 and 112. As discussed below and shown in FIGS. 8-10, a thermal conductivity of the first region 120, second region 122, and third region 170 of the turbine rotor blade 100 may be altered to reduce thermal stresses experienced by the turbine rotor blade 100 during operation of the gas turbine engine 14.

Figure 8:
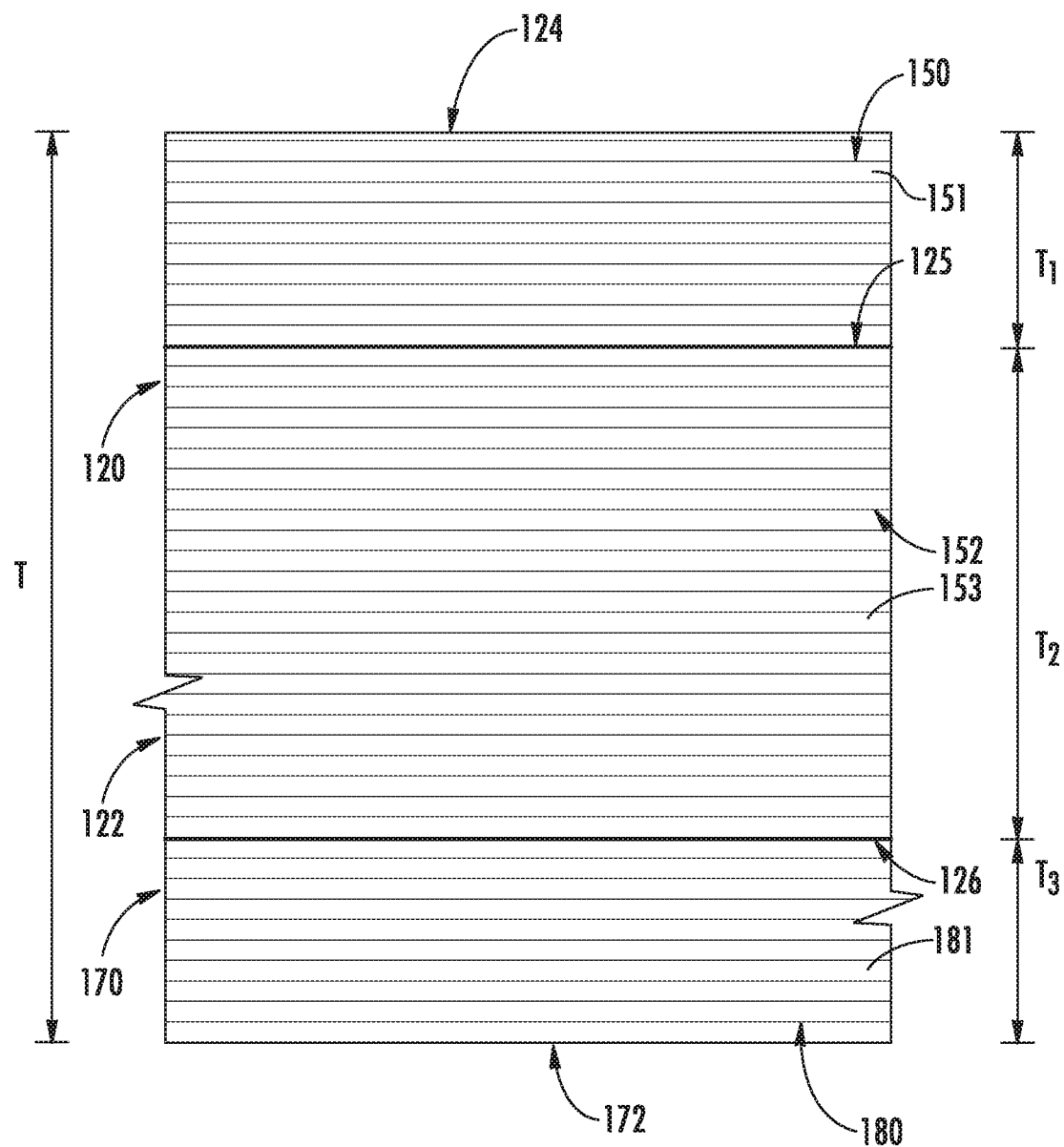
FIG. 8 illustrates a close-up view of a wall of a turbine rotor blade in accordance with an embodiment of the present disclosure.
Figure 9A:
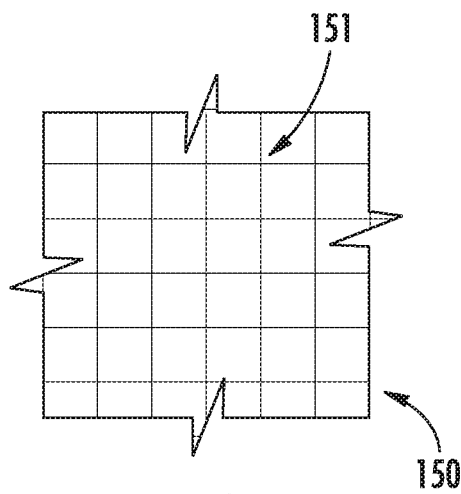
FIG. 9A illustrates a close-up view of a first region of the wall shown in FIG. 8.
Figure 9B:
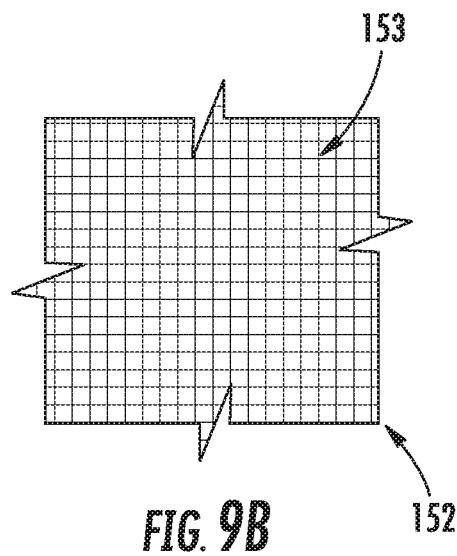
FIG. 9B illustrates a close-up view of a second region of the wall shown in FIG. 8.
Figure 9C:
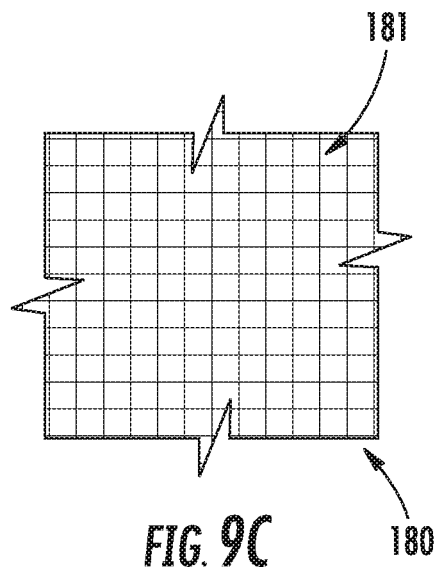
FIG. 9C illustrates a close-up view of a third region of the wall shown in FIG. 8.

Referring specifically to FIG. 8, a close-up view is provided of a wall 140 of the turbine rotor blade 100 of FIG. 7. As shown, the wall 140 is formed of the first region 120, the second region 122, and the third region 170. In particular, the third region 170 defines a thickness $T_3$, and is formed substantially of a third CMC material 180 that may be different than one or both of the first and second CMC materials 150 and 152. Collectively, the thicknesses $T_1$, $T_2$, and $T_3$ of the first, second, and third regions 120, 122, and 170, respectively, define a thickness T of the wall 140. In the embodiment shown, the thickness $T_2$ of the second region 122 is greater than the thickness $T_1$ of the first region 120 and the thickness $T_3$ of the third region 170. However, it should be appreciated that, in some embodiments, the thickness $T_3$ of the third region 170 may be greater than the thickness $T_2$ of the second region 122. Further, in other embodiments, the thickness $T_3$ of the third region 170 may be greater than the thickness $T_1$ of the first region 120. Still further, in yet other embodiments, the thickness $T_3$ of the third region 170 may be greater than the thickness $T_1$ of the first region 120 and the thickness $T_2$ of the second region 122.

In one embodiment, the third CMC material 180 includes one or more plies 181 of CMC material laid-up to form the third region 170. In particular, the third region 170 may define a third thermal conductivity, $k_3$, that is different from at least one of the first thermal conductivity $k_1$ and the second thermal conductivity $k_2$. The third thermal conductivity $k_3$ may, in some embodiments, be distinguished from the first thermal conductivity $k_1$ and the second thermal conductivity $k_2$ by varying the third CMC material 180 forming the third region 170 from the first CMC material 150 forming the first region 120 and the second CMC material 152 forming the second region 122. More specifically, referring now to FIGS. 9A, 9B, and 9C, close-up schematic views are provided of plies of CMC material forming the first CMC material 150, the second CMC material 152, and the third CMC material 180. As is depicted schematically, the second CMC material 152 is formed of a plurality of plies 153 (FIG. 9B) having a greater density than the plurality of plies 181 (FIG. 9C) forming the third region 170. Further, the third CMC material 180 is formed of a plurality of plies 181 (FIG. 9C) having a greater density than the plurality of plies 151 (FIG. 9A) forming the first region 120. Such variation between the density of the first, second, and third CMC materials 150, 152, and 180 may result from varying a spacing of the fibers within the plurality of plies.

Referring still to FIGS. 8 and 9A-9C, the first surface 124 of the first region 120 may, in some embodiments, be cooled by a cooling airflow (not shown) flowing through a cooling passage, such as the cooling passage 114 of FIG. 3, that extends along the span S of the turbine rotor blade 100. Further, the third surface 172 of the third region 170 may be exposed to the hot gas path 70 of the gas turbine engine 14. As such, the first surface 124 is cold relative to the third surface 172 resulting in a temperature gradient between the first and third region 120 and 170. Additionally, there may be locations on the third surface 172 that receive a greater amount of cooling airflow than other locations on the third surface 172, potentially resulting in thermal gradients across the third surface 172. However, since the second region 122 is positioned between the first and third region 120, 170, with the second thermal conductivity $k_2$ being greater than the first and third thermal conductivity $k_1$ and $k_2$, the second region 122 reduces temperature gradients between the first region 120 and the third region 170, as well as along a length of the wall 140 of the turbine rotor blade 100 by relatively quickly distributing heat along the length of the wall 140. More specifically, the second region 122 conducts thermal energy from the first and third regions 120, 170 across the span S of the turbine rotor blade 100 to minimize temperature gradients between the first and third regions 120, 170 and along the span S.

It should be appreciated that, in some embodiments, regions of the wall 140 may define a plurality of micro cooling channels. For example, the first region 120 may define a plurality of micro cooling channels that extend along a length of the first region 120. Further, the micro cooling channels 140 may, in some embodiments, extend between two or more regions of the wall 140, such as the first and second regions 120, 122. Still further, the micro cooling channels may define any suitable size and shape.

Figure 10:
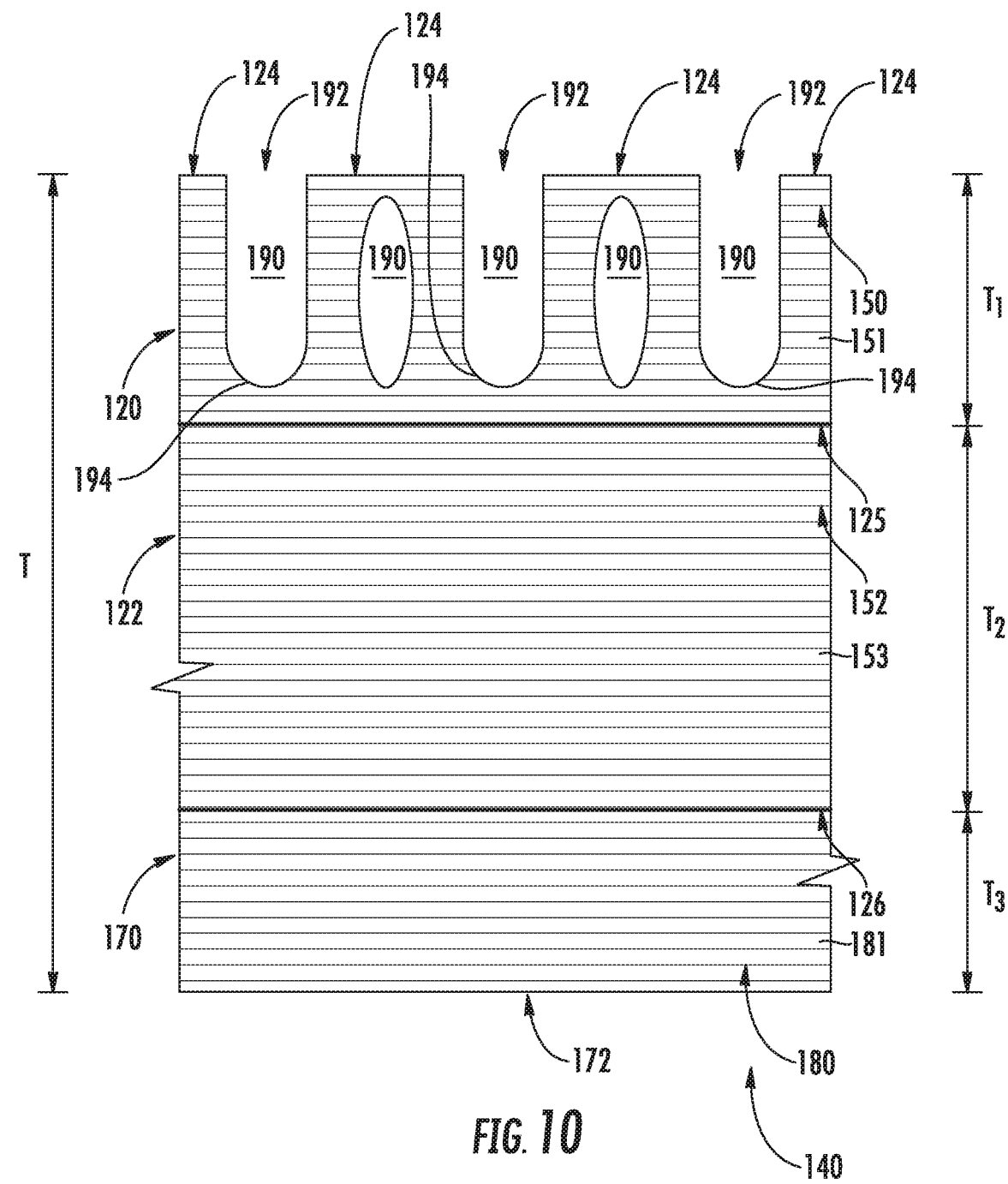
FIG. 10 illustrates a close-up view of another wall of a turbine rotor blade in accordance with the present disclosure.

Referring now briefly to FIG. 10, a close-up view of a wall 140 of a turbine rotor blade 100 in accordance with another exemplary embodiment of the present disclosure is provided. The wall 140 of the turbine rotor blade 100 depicted in FIG. 10 may be configured in substantially the same manner as the wall 140 of the turbine rotor blade 100 depicted in FIG. 8, and accordingly, the same or similar numbers may refer to the same or similar parts. For example, the wall 140 includes a first region 120, a second region 122 positioned adjacent to the first region 120, and a third region 170 positioned adjacent to the second region 122.

However, for the embodiment of FIG. 10, the first region 120 defines a plurality of discrete thermal voids 190 spaced apart along a first surface 124 of the first region 120, and having, e.g., a cylindrical, ovular, or any other suitable cross-sectional shape. Further, each of the plurality of thermal voids 190 extends through a portion of the thickness $T_1$ of the first region 120. More specifically, each of the thermal voids 190 extends from a first end 192 to a second end 194. As shown, the first end 192 is formed on the first surface 124 of the first region 120, and the second end 194 is embedded in the first region 120. Collectively, the thermal voids 190 lower the first thermal conductivity $k_1$ of the first region 120 relative to the second and third thermal conductivity $k_2$ of the second region 122 and the third thermal conductivity $k_3$ of the third region 170. It should be appreciated that thermal voids 190 may, in other embodiments, be formed within other regions of the wall 140 such as, for example, the third region 170. Further, thermal voids 190 may be formed within multiple regions. For example, thermal voids 190 may be formed in the first and third regions 120 and 170.

In addition, for the embodiment depicted, one or more of the thermal voids 190 may be an enclosed void, such that the first and second ends 192, 194 of the one or more thermal voids 190 are both embedded within a region of the wall 140. For example, a thermal void 190 may be formed within the first region 120 such that both the first and second ends 192, 194 of the thermal void 190 are positioned between the first surface 124 and the junction 125 along the thickness $T_1$ of the first region 120. Further, it should be appreciated that in other embodiments, the thermal voids 190 may define any suitable size and shape. For example, in other embodiments, the thermal voids 190 may be grooves formed on the first surface of the first region, extending along a length of the wall.

Figure 11:
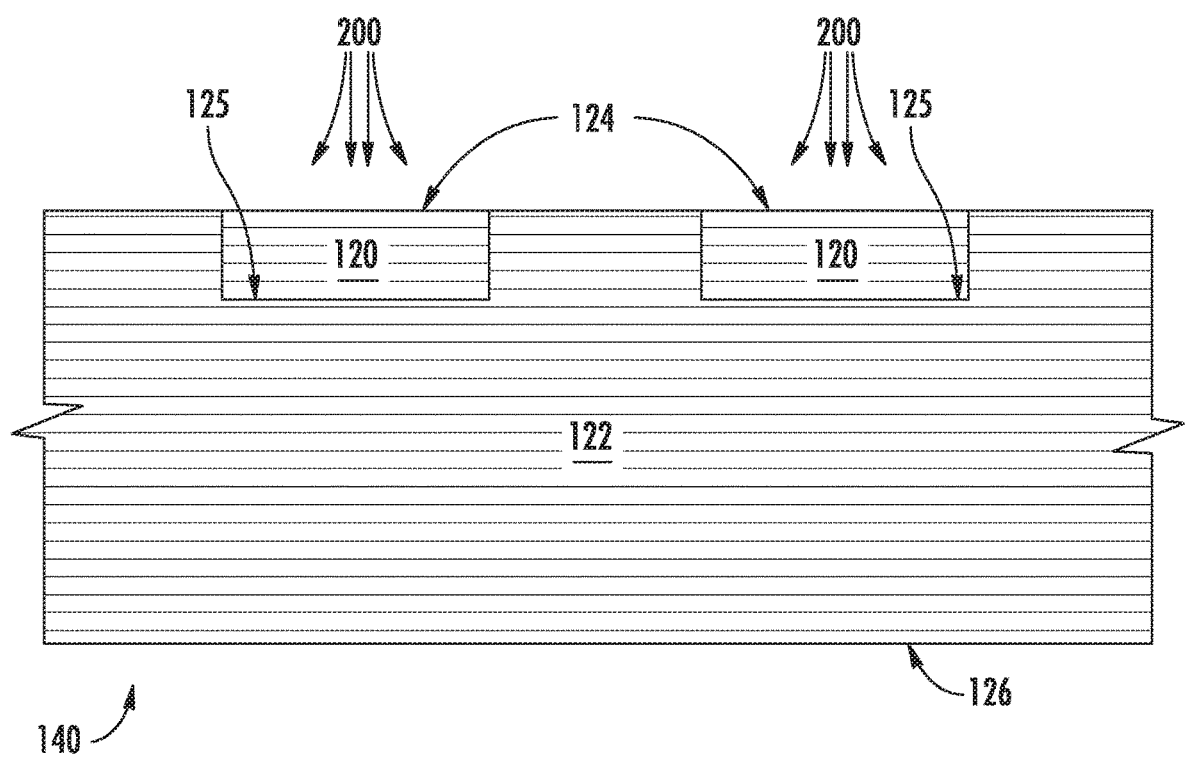
FIG. 11 illustrates a close-up view of a wall of a turbine rotor blade in accordance with an embodiment of the present disclosure.

Referring now briefly to FIG. 11, a close-up view of a wall 140 of a turbine rotor blade 100 in accordance with yet another exemplary embodiment of the present disclosure is provided. The wall 140 of the turbine rotor blade 100 depicted in FIG. 11 may be configured in substantially the same manner as the wall 140 of the turbine rotor blade 100 depicted in FIG. 5, and accordingly, the same or similar numbers may refer to the same or similar parts. For example, the wall 140 of the turbine rotor blade 100 is formed generally of a first region 120 and a second region 122 of the turbine rotor blade 100.

Notably, however, for the embodiment of FIG. 11, the first region 120 forms only a local portion of the wall 140 of the turbine rotor blade. In particular, the first region 120 is configured as a point of contact for a flow of cooling airflow 200, and the first region 120 is additionally configured to redirect such flow of cooling airflow 200 along the wall 140. For example, the first surface 124 of the first region 120 may be a cold side surface of the turbine rotor blade 100 (i.e., a surface within the cooling cavity 114), and may be positioned adjacent to a cooling airflow source such that the cooling airflow 200 first contacts the local region formed by the first region 120.

For the embodiment depicted, the first region 120 defines a lower thermal conductivity than the surrounding portion of the wall 140 formed by the second region 122 of the turbine rotor blade 100. Such a configuration may ensure the cooling airflow 200 received is distributed along the cold side surface of the turbine rotor blade 100 (i.e., by not transferring all of the heat from the hot side surface directly to such cooling airflow 200, warming such cooling airflow 200 to the point it is ineffective at cooling the remaining portions of the cold side surface of the turbine rotor blade) such that a more uniform temperature distribution is provided along the wall 140 of the turbine rotor blade 100. It should be appreciated that, as used herein with reference to the cold side of a wall of a component, the term "local portion" may refer to an area large enough to receive a cooling airflow and redirect such cooling airflow along the surface of the wall of the component.

In general, the exemplary embodiments of the turbine rotor blade 100 mentioned above and depicted in FIGS. 3-8 provide various advantages. In particular, the durability and time on wing (TOW) of the turbine rotor blade 100 improves, because the turbine rotor blade 100 defines a thermal profile that minimizes thermal stresses on the turbine rotor blade 100. More specifically, the turbine rotor blade includes two or more regions having different thermal properties (e.g., thermal conductivity) to distribute temperature gradients in a more uniform manner. As is depicted in the FIGS., there are certain areas of a turbine rotor blade where forming a wall in accordance with one or more of these embodiments may be particularly useful. For example, the wall(s) forming an extended trailing edge region (FIGS. 3, 7), the wall(s) forming a leading edge section (FIGS. 3, 7), locations where relatively hot walls (e.g., pressure side walls) are attached to a relatively cold interior structure (such as a rib; FIG. 4), and where a portion of the airfoil meets a platform or dovetail/shank region (e.g., at a radially inner end of a turbine rotor blade; FIG. 2) are portions of an airfoil that would especially benefit from including regions formed in accordance with one or more embodiments of the present disclosure. Moreover, as discussed with reference to FIG. 11, areas directly subjected to a cooling airflow may also benefit. For example, an area surrounding a film cooling hole (i.e., such that the film cooling hole is defined through the various regions having differing thermal conductivities) may particularly benefit from being configured in accordance with an exemplary aspect of the present disclosure.

It should be appreciated, however, that although the present disclosure has, thus far, been described with reference to turbine rotor blades, other components, such as the shroud, vanes, or liners of the gas turbine engine may additionally be comprised of CMC material in such a way, as discussed above, to alter the thermal profile of the component.

Figure 12:
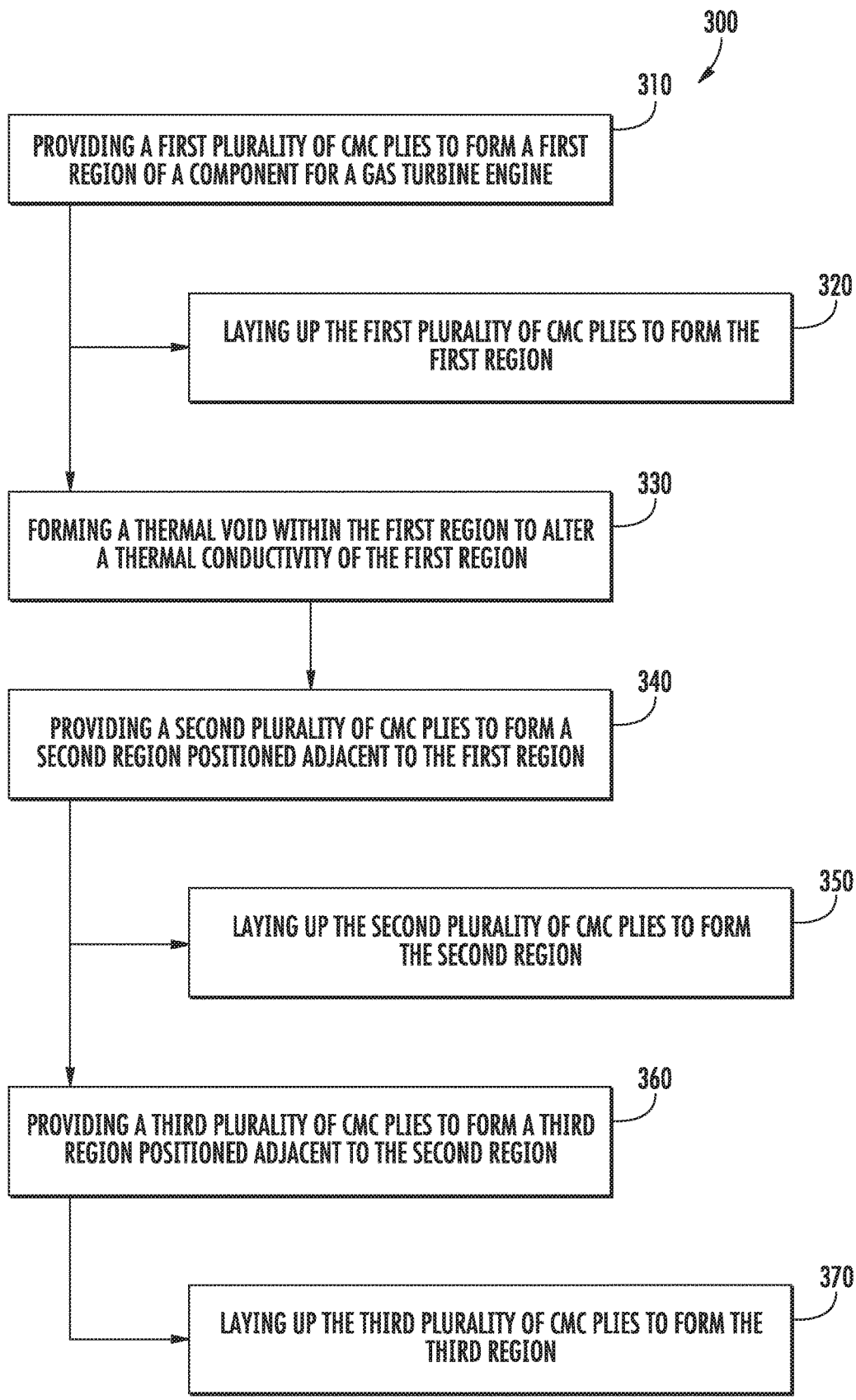
FIG. 12 illustrates a flow chart of a method for manufacturing a component for a gas turbine engine.

Referring now to FIG. 12, a flow diagram of a method 300 for manufacturing a component of a gas turbine engine in accordance with an exemplary embodiment of the present disclosure is provided. The exemplary method 300 of FIG. 12 may be utilized with one or more of the exemplary turbine rotor blades 100 described above with reference to FIGS. 5-10. Although FIG. 12 depicts steps performed in a particular order for purposes of illustration and discussion, the methods discussed herein are not limited to any particular order or arrangement. For example, it will be appreciated that various steps of the methods disclosed herein can be omitted, rearranged, combined, and/or adopted in various ways without deviating from the scope of the present disclosure.

As shown in FIG. 12, the method (300) includes, at (310), providing a first plurality of CMC plies to form a first region of the component, wherein the first region defines a first thermal conductivity. More specifically for the exemplary aspect depicted, providing the first plurality of CMC plies to form the first region at (310) includes laying up the first plurality of CMC plies at (320) to form the first region. Further, in some embodiments, providing the first plurality of CMC plies to form the first region at (310) may include providing resin or other bonding agents, and may further include curing the first region such that each ply of the first plurality of CMC plies bonds to adjacent plies of the first plurality of CMC plies.

At (330), a thermal void is formed within the first region to alter the thermal conductivity of the first region. It should be appreciated that, in some embodiments, however, forming a thermal void at (330) may be optional. Further, in some embodiments, forming the thermal void at (330) may be considered a passive step that is included within (310) of method (300).

Additionally, at (340) the method (300) includes providing a second plurality of CMC plies to form a second region, wherein the second region defines a second thermal conductivity and is positioned adjacent to the first region and is integral with the first region. More specifically, for the exemplary aspect depicted, providing the second plurality of plies to form the second region at (340) includes laying up the second plurality of plies at (350) to form the second region. Further, in some embodiments, providing the second plurality of CMC plies to form the second region at (340) may include providing resin or other bonding agents, and may further include curing the second region such that each ply of the second plurality of CMC plies bonds to adjacent plies of the second plurality of CMC plies.

At (360), the method (300) includes providing a third plurality of CMC plies to form a third region at a location that is adjacent to the second region and integral with the second region, wherein the third region defines a third thermal conductivity that is different from at least one of the first thermal conductivity and the second thermal conductivity. More specifically, for the exemplary aspect depicted, providing the third plurality of plies to form the third region at (360) includes laying up the third plurality of plies at (370) to form the third region. Further, in some embodiments, providing the third plurality of CMC plies to form the third region at (360) may include providing resin or other bonding agents, and may further include curing the third region such that each ply of the third plurality of CMC plies bonds to adjacent plies of the third plurality of CMC plies.

As stated, one or more of the first, second, and third regions define different thermal conductivities. In certain exemplary aspects, the different thermal conductivity may result from providing different CMC plies at (310), (340), and/or (360). For example, in certain exemplary aspects, the CMC plies provided at (310), (340), and/or (360) may have different densities, resulting in the different thermal conductivities of the respective regions. Additionally, or alternatively, in certain exemplary aspects, the method (300) may further include different processing steps for one or more of the regions to result in the different thermal conductivities of the regions. For example, in certain exemplary aspects, providing the first plurality of CMC plies at (310) may further include utilizing a first thermal and/or chemical processing to form the first region, providing the second plurality of CMC plies at (340) may further include utilizing a second thermal and/or chemical processing to form the second region, and providing the third plurality of CMC plies at (360) may further include utilizing a third thermal and/or chemical processing to form the third region. In certain exemplary aspects, one or more of the first, second, or third thermal and/or chemical processing may be varied to alter a thermal conductivity of the respective region.

In general, the exemplary embodiment of the method mentioned above and depicted in FIG. 12 provides various advantages. In particular, the method mentioned above improves upon the durability and TOW of a component for a gas turbine engine, because the turbine rotor blade 100 defines a thermal profile that minimizes thermal stresses on the turbine rotor blade 100. More specifically, component includes two or more regions having different thermal properties (e.g., thermal conductivity) to distribute temperature gradients in a more uniform manner.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a gas turbine engine, the component comprising:

a first region formed substantially of a first ceramic matrix composite (CMC) material, the first region defining a first thermal conductivity, wherein the first region further defines a first thermal void having a first shape and a second thermal void having a second shape, wherein the first shape is different than the second shape, the first thermal void and the second thermal void extend through a portion of the first CMC material of the first region; and a second region formed substantially of a second CMC material, the second region defining a second thermal conductivity, the component defining a thickness and the first region positioned adjacent to the second region along the thickness, the first thermal conductivity being different than the second thermal conductivity for altering a thermal profile of the component.

2. The component of claim 1, wherein a density of the first CMC material is greater than a density of the second CMC material such that the first thermal conductivity is greater than the second thermal conductivity.

3. The component of claim 1, wherein the first region comprises a first surface, wherein the second region comprises a second surface, wherein the first surface is a cold side surface of the component and the second surface is a hot side surface of the component, and wherein the thickness is defined in a direction perpendicular to the second surface.

4. The component of claim 1, wherein the second thermal conductivity is at least 10% different than the first thermal conductivity.

5. The component of claim 3, further comprising:
a third region positioned adjacent to the second region and formed substantially of a third CMC material, wherein the third region defines a third thermal conductivity, wherein the third thermal conductivity is different than at least one of the first thermal conductivity or the second thermal conductivity, wherein the thickness of the component is defined in a direction perpendicular to the second surface, and wherein the first region, the second region, and the third region are arranged in series along the thickness.

6. The component of claim 5, wherein a thickness of the second region is greater than a thickness of the first region and a thickness of the third region.

7. The component of claim 5, wherein the second thermal conductivity is greater than the first thermal conductivity and the third thermal conductivity.

8. The component of claim 1, wherein the component is a turbine rotor blade defining a span, and wherein the turbine rotor blade further defines a cooling passage that extends through the turbine rotor blade along the span.

9. The component of claim 8, wherein the first region comprises a first surface exposed to the cooling passage, and wherein the second region comprises a second surface exposed to a hot gas flow path of the gas turbine engine.

10. The component of claim 8, wherein a density of the second CMC material is greater than a density of the first CMC material such that the second thermal conductivity is greater than the first thermal conductivity.

11. The component of claim 8, wherein the first and second regions form a wall of the turbine rotor blade.

12. The component of claim 11, wherein the wall is at least one of a pressure side wall of the turbine rotor blade or a suction side wall of the turbine rotor blade.

13. The component of claim 11, wherein a thickness of the second region is greater than a thickness of the first region, wherein the first region comprises a first surface exposed to the cooling passage, and wherein the second region comprises a second surface exposed to a hot gas flow path of the gas turbine engine.

14. The component of claim 11, wherein the wall forms at least one of a leading edge of the turbine rotor blade or a trailing edge of the turbine rotor blade.

15. The component of claim 1, wherein the component is configured as at least one of a shroud, compressor rotor blade, compressor vane, turbine rotor blade, or turbine nozzle.

16. A method for manufacturing a component of a gas turbine engine, the method comprising:

providing a first plurality of ceramic matrix composite (CMC) plies to form a first region of the component, the first region defining a first thermal conductivity;

forming a first thermal void having a first shape and a second thermal void having a second shape within the first region, wherein the first shape is different than the second shape; and providing a second plurality of CMC plies to form a second region, the second plurality of CMC plies being provided to a location adjacent to the first plurality of CMC plies such that the second region is positioned adjacent to the first region, the second region defining a second thermal conductivity, the second thermal conductivity being different than the first thermal conductivity.

17. The method of claim 16, wherein a density of the first plurality of CMC plies is greater than a density of the second plurality of CMC plies such that the first thermal conductivity is greater than the second thermal conductivity.

18. The method of claim 16, further comprising:
providing a third plurality of CMC plies to form a third region, the third plurality of CMC plies being provided to a location adjacent to the second plurality of CMC plies such that the third region is positioned adjacent to the second region, the third region defining a third thermal conductivity, the third thermal conductivity being different than at least one of the first thermal conductivity and the second thermal conductivity.

19. The method of claim 18, wherein providing the first plurality of CMC plies to form the first region includes laying up the first plurality of plies to form the first region, wherein providing the second plurality of CMC plies to form the second region includes laying up the second plurality of CMC plies adjacent to the first plurality of CMC plies, and wherein providing the third plurality of CMC plies to form the third region includes laying up the third plurality of CMC plies adjacent to the second plurality of CMC plies.

20. The method of claim 16, wherein providing the first plurality of CMC plies to form the first region comprises processing the first plurality of CMC plies using a first thermal or chemical processing, wherein providing the second plurality of CMC plies to form the second region comprises processing the second plurality of CMC plies using a second thermal or chemical processing, and wherein the first thermal or chemical processing is distinct from the second thermal or chemical processing to vary a thermal conductivity of the first region relative to the second region.

21. A component for a gas turbine engine, the gas turbine engine defining a core air flowpath, and the component comprising:

a first region formed substantially of a first ceramic matrix composite (CMC) material, the first region defining a first density, a first thermal conductivity, and a first surface being a cold side surface, wherein the first region defines a first thermal void having a first shape and a second thermal void having a second shape, wherein the first shape is different than the second shape; and a second region formed substantially of a second CMC material, the second CMC material defining a second density, a second thermal conductivity, and a second surface being a hot side surface;

wherein the component defines a thickness in a direction perpendicular to the second surface, wherein the first region is positioned adjacent to the second region along the thickness, wherein first density is different than the second density and the first thermal conductivity is different than the second thermal conductivity for altering a thermal profile of the component.

22. The component of claim 1, wherein the first thermal void is embedded within the first region, and wherein the second thermal void includes an open groove portion.

* * * * *